Feb. 26, 1957  H. HESKY  2,783,093
APPARATUS FOR DISTRIBUTING AND SPRAYING
LIQUIDS OVER CIRCULAR AREAS
Filed Nov. 29, 1954
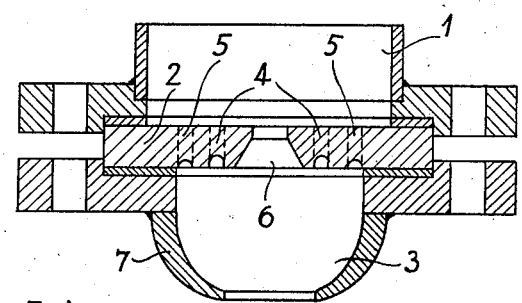
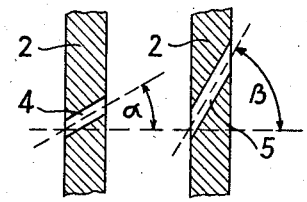
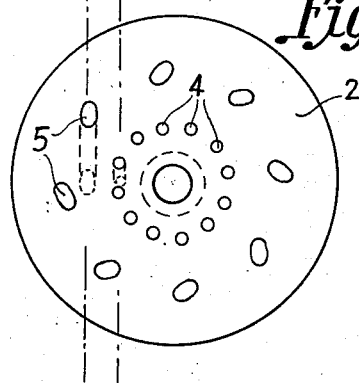
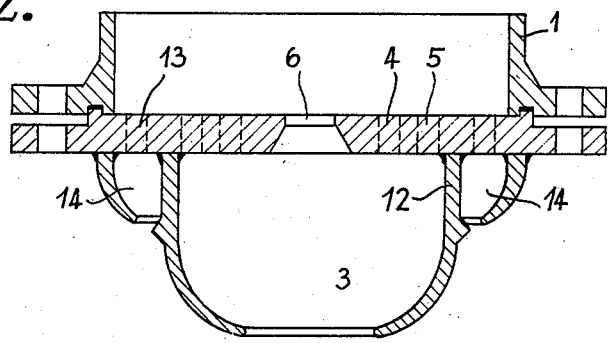
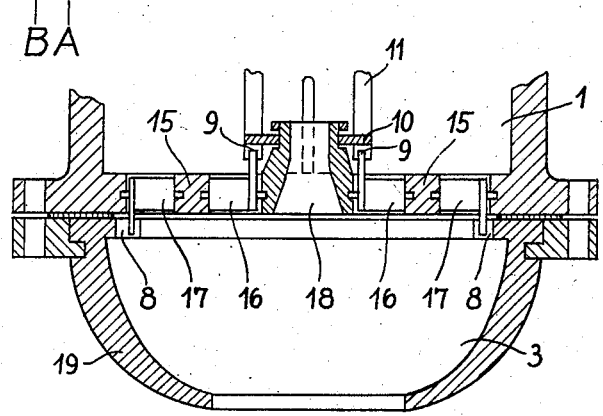
INVENTOR:
HANS HESKY
BY
Richardson, David and Nordon
his ATTORNEYS.

United States Patent Office 2,783,093
Patented Feb. 26, 1957

2,783,093

APPARATUS FOR DISTRIBUTING AND SPRAYING LIQUIDS OVER CIRCULAR AREAS

Hans Hesky, Dortmund, Germany, assignor to Friedrich Uhde G. m. b. H., Dortmund, Germany, a corporation of Germany Application November 29, 1954, Serial No. 471,871

Claims priority, application Austria December 5, 1953

6 Claims. (Cl. 299—120)

The present invention relates to a process and apparatus for distributing and spraying liquids over circular areas.

In industry, particularly in chemical industry, it is often necessary to distribute liquids by spraying in a predetermined manner over areas which in most cases are circular, without spraying considerably beyond the perimeter of the area. In most cases it is required to spray a liquid in as uniform a distribution as possible over the entire area to be sprayed, for example, when spraying columns packed with filling bodies for scrubbing gases, which columns are operated with gas below a certain lower limiting velocity, as is the usual practice. Since in the said packed column the gas itself exerts no influence upon the distribution of the liquid, the liquid flows through between the filling bodies substantially in its initial state of distribution. This is the case especially when the proportion of the size of the individual filling bodies to the cross-section of the column is small. In order to attain good working of the packed column, it is, therefore, necessary to distribute the liquid as uniformly as possible at the commencement. This applies especially to columns of large cross-section and into which only relatively small quantities of liquid are introduced. When the distribution of the liquid is not uniform, the resistance to flow of gas, is considerably increased in zones more highly charged with liquid and the current of gas is thus deflected to zones which are less highly charged, whereby the efficiency of the packed column is affected. Furthermore, a small charge of liquid may give rise to the formation of small continuous trickles of fluid which may render the distribution of liquid within the packed column even less uniform. It is of importance that the liquid be not sprayed beyond the perimeter of the circular area, that is to say not on the wall of the column, since if sprayed there it would flow down the wall and be essentially lost in the scrubbing process.

A non-uniform type of liquid distribution may be desirable in the case of sprayed packed columns which are operated with gas at or above the lower limiting velocity. The accumulation of liquid at the wall of the column which is caused by the influence of the gas current on the distribution of the liquid and by the larger cross-sections of the passages through the packing adjacent the walls, can be partially counteracted by introducing the liquid into the middle of the packed column in a larger quantity than at the sides, so that there is a balance with the liquid accumulating at the wall and thus an optimum mean charge of liquid is attained over the entire cross-section of the column at all heights.

Many apparatus for the distribution of liquid have been developed, but none of them gives a completely satisfactory distribution.

In order to attain a uniform distribution, a turbulence nozzle has frequently been used. It comprises a guiding device for directing the liquid in a particular manner into a chamber (mixing chamber) from an opening in which it emerges into the tower in the form of a rotating jet and, due to centrifugal force, bursts into individual drops at a short distance from the opening after the influence of the constriction of the jet has ceased. The individual drops initially retain the direction of motion which they had as part of the jet of liquid immediately before the disintegration thereof. The guiding device of this known distributor is constructed in such a manner that an angular momentum is imparted to a part of the liquid by means of oblique conduits, each of which has the same inclination towards the meridian plane (plane running through the axis of angular momentum which coincides with the axis of the distributor) and is at the same distance from the axis of angular momentum; whereas the rest of the liquid enters without angular momentum through a central conduit into the mixing chamber from which the liquid jet emerges.

Apparatus are also known in which the angular momentum is produced by tangential introduction of the liquid into the mixing chamber.

In all apparatus and processes hitherto known the guiding device imparts one constant angular momentum to a part of the liquid and furthermore has a central conduit through which passes the rest of the liquid with and angular momentum=0, angular momentum meaning the product ($u.r$) of current velocity component perpendicular to the meridian plane ($u$) and distance ($r$) from the axis of angular momentum. According to Keppler's law the total of all angular momenta is constant in an apparatus which is not subjected to the action of an external force. When the portion of liquid to which one constant angular momentum has been conveyed mixes in the mixing chamber with the portion of liquid coming from the central conduit having an angular momentum=0, there is obtained in the liquid current, as the mixing proceeds, a distribution of angular momentum depending on the radius. This distribution of angular momentum in each case determines the direction in which an individual drop of liquid flies off when the liquid jet disintegrates and thus also determines the distribution of the liquid over the area which is to be sprayed.

Assuming that any particular distribution, for example a uniform distribution, of a liquid over an area is desired, then a corresponding distribution of angular momentum must be attained on exit from the nozzle. Since the distribution of angular momentum at the exit from the nozzle is attained by a mixing process following the distribution of angular momentum achieved by the guiding device, it is obvious that the latter must produce a distribution which is capable of being transformed by a mixing process into the necessary final distribution of angular momentum. In the distributors hitherto known which are based on the angular momentum principle there is produced by the guiding device only one type of distribution of angular momentum, i. e. either the angular mometum=0 or the angular momentum is different from 0 and constant. The only variable in controlling the desired final distribution is the ratio of the quantity of liquid having a constant angular momentum to the quantity of liquid having no angular momentum at all and this permits only a certain degree of adjustment which does not meet the requirements.

The present invention provides an improved process and improved apparatus for distributing and spraying liquids over circular areas, the said apparatus comprising elements as set forth above, namely a distributor having a guiding device and in this case one or more mixing chambers.

Now I have found that the before mentioned disadvantages of the known processes and apparatus can be overcome and that it is possible to distribute or to spray liquids over circular areas, while attaining a desired pattern of distribution as exactly as possible with a well-defined perimeter, by dividing the liquid to be distributed into at least two fractions, imparting to each of said fractions an angular momentum different from 0, then mixing said fractions and emerging this liquid mixture so as to distribute it. For instance, to each of a plurality of fractions of the total quantity of liquid being simultaneously distributed or sprayed, an angular momentum different from 0 is imparted before the liquid enters a mixing chamber. The liquid may be introduced into the mixing chamber through conduits which are arranged in two or more concentric circles and differ from one another in cross-section and inclination towards the meridian plane. It may also be introduced in a tangential or spiral manner into the mixing chamber through concentric ring conduits.

The process of the invention may be carried out with or without the use of a central passage giving a liquid jet having no angular momentum. In special cases one or more orders of angular momentum may be arranged in a direction of rotation opposite to that of the rest of the orders of angular momentum. This can be achieved in various ways: for example, to the central liquid jet another direction of rotation than that of the surrounding orders of angular momentum may be imparted, or around and next to the central jet having no angular momentum an order of angular momentum may be arranged rotating in a direction opposite to that of another or all other orders of angular momentum. In this manner, the distributor is rendered especially stable against any air penetrating into the mixing chamber and cavitation.

The more orders of angular momentum which are applied according to the invention, the more precisely can the final distribution of the liquid be adjusted to a desired pattern and the sharper the perimeter of the sprayed area. This applies both to a uniform distribution and to any desired kind of non-uniform distribution. Experience has shown that in most cases two orders of angular momentum suffice for attaining a uniform distribution or a distribution providing for drops of equal size. When in special cases, however, a stricter adjustment or a more complicated pattern of distribution is desired, more orders of angular momentum, for example three or four orders, are suitable, for example when gas currents are to be produced or influenced by a particular distribution of the spraying intensity, for instance with injection nozzles for pre-chamber compression ignition engines. Also in these cases the process of the invention can be advantageously applied. More than four orders of angular momentum can be used if required.

Due to the fact that more than one order of angular momentum different from 0 is imparted to the liquid, considerably more variables are available for adjustment to produce a desired distribution. For example, with two orders of angular momentum four variables are available, i. e.:

1. The ratio of the two orders of angular momentum to one another,

2. The ratio of the fractions of liquid to which the different angular momenta have been imparted, 3. The ratio of the distances between the individual axes of the openings of the conduits into the mixing chamber, 4. When there is a central conduit giving a liquid jet having no angular momentum: the ratio of the fractions of liquid to which angular momenta have been imparted to the fraction constituting the middle jet having no angular momentum.

It is obvious that by means only of these four variables a great influence can be exerted on the pattern of the angular momentum at the opening of the distributor. If these four variables are not sufficient for some particular distribution, the necessary adjustment can be attained by providing for further orders of angular momentum in the guiding device. In most cases in which a uniform distribution over a circular area is required, two orders of angular momentum suffice, sharp perimeters of sprayed area being obtained. When drops of a uniform size are to be obtained, which is of interest in many cases and means that there is required a constant acceleration of deformation in the cross-section of the jet in which disintegration takes place, then an almost uniform distribution of drops is also achieved at the same time.

Thus distributors according to the invention which are designed for uniform spraying, simultaneously provide drops of an almost uniform size. Any necessary adjustment to a uniform size of drops can be achieved by enlarging the mixing chamber. Moreover, from the fact that the size of the drops can to a large extent be predetermined by appropriate dimensioning of the apparatus, advantages arise in the spraying of packed columns, since in this manner no relatively smaller particles of liquid are produced which would be carried along by the gas out of the column chamber. A uniform drop size is, however, of particular importance when granular material of uniform, preferably globular, form is to be produced from a fused mass by spraying.

This invention also provides an apparatus suitable for carrying out the process of the invention, which apparatus comprises a guiding device arranged between a supply pipe for the liquid and a mixing chamber; it is an essential feature of the apparatus that the conduits of the guiding device are arranged in at least two concentric circles. If desired, a further conduit may be arranged in the axis of the guiding device in order to produce a central jet having no angular momentum.

For particular purposes the conduits of the guiding device may be advantageously formed by guide blades which are preferably adjustable. In this manner a distributor is obtained which can be empirically adjusted to an optimum effect when a non-uniform distribution is required.

Further features of the invention are the particular dimensions of the conduits of the guiding device and the mixing chamber and the manner in which they are arranged.

An apparatus suitable for use in carrying out the process of this invention is illustrated diagrammatically by way of example in the accompanying drawings in which:

Fig. 1 represents a distributor in vertical section through the center thereof and Fig. 2 represents the guiding device thereof in plan view; Fig. 3 represents the guiding device in section along A—A and Fig. 4 is a section along B—B, of Fig. 2. Fig. 5 represents in vertical section a distributor comprising a guiding device formed by adjustable guide blades. Fig. 6 is a vertical section through a modified form of distributor.

Referring to the drawings, the distributor comprises a supply pipe 1 for the liquid, a guiding device 2 or 15 (Figs. 1 and 5) and a mixing chamber 3 for the liquid. The guiding device 2 is provided with conduits 4 and 5 or 16 and 17 arranged in two concentric circles and an additional central conduit 6 or 18 arranged in the axis of the guiding device.

The conduits 4 and 5 or 16 and 17 are at the same angle to the meridian plane (cf. Figs. 3 and 4) so that in each of the circles an angular momentum in the same direction is produced. In order to attain a uniform distribution over the area to be sprayed, the following dimension ratios have proved suitable:

The diameters of the two circles in which the conduits 4 and 5 or 16 and 17 are arranged are in a mathematical ratio of about 0.5:1 to about 0.7:1. The ratio of the sine of the angle of inclination $\alpha$ of the conduits 4 or 16 in the guiding device 2 or 15 in the inner circle to the sine of the angle of inclination $\beta$ of the conduits 5 or 17 in the outer circle is about the same as that of the diameters of the respective circles to one another. The ratio of the sum total of the cross-sections of the conduits 4 or 16 in the inner circles to the sum total of the cross-sections of the conduits 5 or 17 in the outer circles is about 1.2:1 to about 1.6:1. The ratio of the cross-section of the central conduit 6 or 18 to the sum total of the cross-sections of the conduits 5 or 17 in the outer circle is about 0.45:1 to about 0.9:1. The ratio of the height of the mixing chamber 3 to the diameter of the outer circle of conduits is about 0.5:1 to about 1:1, the diameter of the mixing chamber preferably being about equal to the diameter of this outer circle of conduits.

Bell 7, provided with an opening and forming the mixing chamber 3 may also be constructed so as to be adjustable by a screw in order to provide for continuous variation of the height of the mixing chamber.

In the apparatus shown in Fig. 5 the conduits 16 and 17 of guiding device 15 are formed by guide blades. The inclination of these blades can be adjusted from the exterior while the apparatus is in operation. For this purpose, the bell 19 is pivoted and adapted to move the blades forming the outer conduits 17 by means of abutments 8 of suitable form, while the blades of the inner conduits 16 can be adjusted by means of a loose ring 10 fitted at the base with prolongations 9 and which can be turned by a rod 11.

In order to enlarge the aperture angle of the cone of the spray, it may be necessary to construct the mixing chamber of several co-axial parts, preferably two parts, and thus produce a variation in the pressure distribution over the radius of the combined mixing chamber.

Figure 6 represents such a device. A partition 12 divides the mixing chamber into a chamber 3 and a chamber 14 encircling chamber 3. Due to the centrifugal force in the rotating current, the highest pressure in the inner mixing chamber is at the inner side of wall 12, whereas the pressure is lower at the side facing chamber 14. In this manner the result is achieved that, when the drops leave chamber 14 after the liquid jet has disintegrated, the axial component is small as compared with the tangential component of the spray so that the drops fly off at a considerably smaller angle than would be possible without the partition 12. By adjusting the cross-sections of the chambers to one another by experiment the result can be attained that the drops coming from the outer side of the partition have the same direction as those coming from the inner side, so that the fraction of liquid coming from chamber 14 immediately joins the fraction coming from chamber 3. The number of the concentric conduit groups opening into chambers 3 and 14 depends on the desired function. For example, central jet 6 and conduit groups 4 and 5 may advantageously open into chamber 3, the dimension ratios in this system being advantageously chosen as indicated above, and chamber 14 is supplied through conduit group 13.

The process of the invention may be applied, for example, in the following processes or apparatus: absorption of nitrose; sulphuric acid tower system; absorption of sulphur dioxide and sulphur trioxide; washing towers for, for example, coke-oven gas and hydrocarbons; saturaters and desiccators; CO-reaction furnaces into which water is injected directly; rectifying and distilling columns containing packings; extraction columns; cooling plants; condensers; spraying nozzles for removing foam from cellulose suspensions, for example in the paper industry; spraying devices for uniformly spraying coatings or paints; spraying of fused masses, such as melts of artificial fertilizers or polyvinyl chloride; atomization nozzles for all fields in which a single substance is sprayed with the application of pressure, for example spray driers, especially for the food industry and the spraying of fuel, for example in diesel-engines.

The following examples serve to illustrate the invention, but they are not intended to limit it thereto:

*Example 1*

Behind a reforming plant, used for producing carbon dioxide and hydrogen containing gases from methane, a cooling tower is installed. The latter has a diameter of 2.5 m. and a height of 10 m. Up to now towers of this kind were filled with Raschig rings which, however, were highly contaminated by separating fractions of soot and tar so that the packing had to be renewed after a short time. The water and the gas were charged in the same direction.

The tower has now been modified as follows: a nozzle according to the invention (cf. Figure 1) providing two orders of angular momentum different from 0 has been installed. About 2 m. below the upper end of the tower, a plate having apertures of about 30 mm. has been built in. By this plate the water jets emerging from the nozzle are directed vertically downward. The Raschig rings have been removed. The amount of water introduced into the tower is 45 m.³ per hour. The tower can be used for years without cleaning, while apparatus of the known kind had to be cleaned every three months.

The nozzles according to the invention provide two orders of angular mementum different from 0 and exhibit the following characteristics:

The ratio of the diameters of the two circles in which the conduits are arranged is 0.58:1. The ratio of the sine of the angle of inclination $\alpha$ of the conduits in the inner circle to the sine of the angle of inclination $\beta$ of the conduits in the outer circle is 0.57:1. The ratio of the sum total of the cross-sections of the conduits in the inner circle to the sum total of the cross-sections of the conduits in the outer circle is 1.4:1. The ratio of the cross-section of the central conduit to the sum total of the cross-sections of the conduits in the outer circle is 0.64:1. The ratio of the height of the mixing chamber to the diameter of the outer circle of conduits is 0.70:1.

*Example 2*

After reforming gas has been converted into carbon monoxide without the application of pressure, the carbon monoxide is introduced into a terminating condenser. In the latter the large amount of vapor contained in the gas and necessary for the conversion is condensed and the gas is cooled from 150° C. to about 35° C. at a pressure of 1.3 atmospheres absolute. The terminating condenser comprises a packed column of a diameter of about 2 m. and a height of about 6 m. In the packed column the gas is cooled by direct spraying with water conducted in a counter-current. The terminating condenser is operated with 150 m.³ of river water and about 60,000 normal m.³ of humid gas having a dew point of about 80° C. When a nozzle according to the invention is used for spraying the packed column with cooling water, the height of the packed column can be decreased to 4 m., that is to say by 30%, whereby the loss in pressure is also decreased by about 30%. In order to avoid cavitation, a nozzle providing for 3 orders of angular momentum is applied. The central jet has no angular momentum. The direction of rotation of the order of angular momentum arranged around and next to the central jet is opposite to that of the two outer orders of angular momentum.

*Example 3*

A nitric acid plant consists of 7 packed towers, each having a diameter of 6 m. and being packed to a height of 25 m. Each tower is packed with Raschig rings of a diameter of 80 mm. each. The plant is charged with 3.1 tons per hour of nitrogen as nitrose under a pressure of 1.5 atmospheres absolute, the nitrogen being introduced in a concentration of 8.5%. The first two towers are provided with nozzles as shown in Fig. 1 of the drawings, i. e. in the first tower a nozzle for a charge of 450 m.³ of liquid per hour and in the second one a nozzle for a charge of 300 m.³ per hour of liquid. The rest of the towers are charged with 150 m.³ per hour of liquid. In each tower the liquid is conducted in a cycle. In this manner, the acid content of the gas drops at the outlet of the first tower from 145 mg./l. to 70 mg./l. By this decrease in acid content, which continues through all the following towers until the final gas is obtained, although the last 5 towers are not provided with nozzles according to the invention, the loss in nitric acid in the final gas is decreased from 11.4 mg./l. to 7 mg./l.

When known nozzles are used, the spraying within the towers is as follows:

In the first tower: 450 m.³ per hour; acid content=46 percent by weight of nitric acid; in the second tower: 300 m.³ per hour; acid content=38 percent by weight of nitric acid. When the nozzles according to the invention (cf. Fig. 1 of the drawing) are used in the first tower, the content of nitric acid in the second tower decreases by 2 percent by weight. The nozzles of the invention provide two orders of angular momentum different from 0 and show the following characteristics: the ratio of the diameters of the two circles in which the conduits are arranged is 0.58:1. The ratio of the sine of the angle of inclination α of the conduits in the inner circle to the sine of the angle of inclination β of the conduits in the outer circle is 0.57:1. The ratio of the sum total of the cross-sections of the conduits in the inner circle to the sum total of the cross-sections of the conduits in the outer circle is 1.4:1. The ratio of the sum total of the cross-section of the central conduit to the sum total of the cross-sections of the conduits in the outer circle is 0.64:1. The ratio of the height of the mixing chamber to the diameter of the outer circle of conduits is 0.70:1.

I claim:

1. An apparatus for distributing liquids over circular areas, comprising a supply pipe, a liquid guiding device provided with a plurality of conduits in communication with said pipe and arranged in at least two concentric circles, the ratio between the diameters of said concentric circles ranging between about 0.5:1 and about 0.7:1, and an open mixture chamber operatively connected with said guiding device and in communication with said conduits remote from said pipe and said opening, wherein the ratio of the sine of the angle of inclination of the conduits in the guiding device in the inner circle to the sine of the angle of inclination of the conduits in the outer circle is about the same as the ratio of the diameter of the inner circle to the diameter of the outer circle.

2. An apparatus as claimed in claim 1, wherein the ratio of the sum total of the cross-sections of the conduits in the inner circle to the sum total of the cross-sections of the conduits in the outer circle ranges between about 1.2:1 to about 1.6:1.

3. An apparatus as claimed in claim 1, wherein said guiding device is provided with a central conduit extending between said pipe and said chamber, the ratio of the cross-section of the central conduit to the sum total of the cross-sections of the conduits in the outer circle ranging between about 0.45:1 to about 0.9:1.

4. An apparatus as claimed in claim 1, wherein the ratio of the height of the mixing chamber to the diameter of the outer circle of conduits is about 0.5:1 to about 1:1.

5. An apparatus as claimed in claim 1, wherein the ratio of the height of the mixing chamber to the diameter of the outer circle of conduits is about 0.5:1 to about 1:1, the diameter of the mixing chamber being about equal to the diameter of the outer circle of conduits.

6. An apparatus for distributing liquids over circular areas, comprising a supply pipe, a liquid guiding device provided with a central conduit and with a plurality of conduits arranged in at least two concentric circles, all of said conduits being in communication with said pipe, the conduits of said concentric circles differing from each other in cross-section and being inclined at different angles with respect to the meridian plane, the ratio of the sine of the angle of inclination of the conduits of the inner circle to the sine of the angle of inclination of the conduits of the outer circle ranging between about 0.5:1 and 0.7:1, the ratio of the sum total of the cross-sections of the conduits of the inner circle to the sum total of the cross-sections of the conduits of the outer circle ranging between about 1.2:1 and about 1.6:1, the ratio of the cross-section of the central conduit to the sum total of the cross-sections of the conduits in the outer circle ranging between about 0.45:1 and about 0.9:1, and an open mixing chamber operatively connected with said guiding device and in communication with said conduits remote from said pipe and said opening, said mixing chamber being of approximately the same diameter as the outer circle of conduits, the ratio of the height of the mixing chamber to the diameter of the outer circle of conduits ranging between about 0.5:1 to about 1:1.

References Cited in the file of this patent

UNITED STATES PATENTS

| 562,245 | Rundquist | June 16, 1896 |
| 625,466 | Randolph | May 23, 1899 |
| 1,620,209 | Ihne | Mar. 8, 1927 |
| 2,569,081 | Veach | Sept. 25, 1951 |

FOREIGN PATENTS

| 187,339 | Great Britain | Oct. 23, 1922 |